March 2, 1937. L. ROBINSON 2,072,215
WIRE CABLE END CLAMP
Filed Feb. 14, 1935
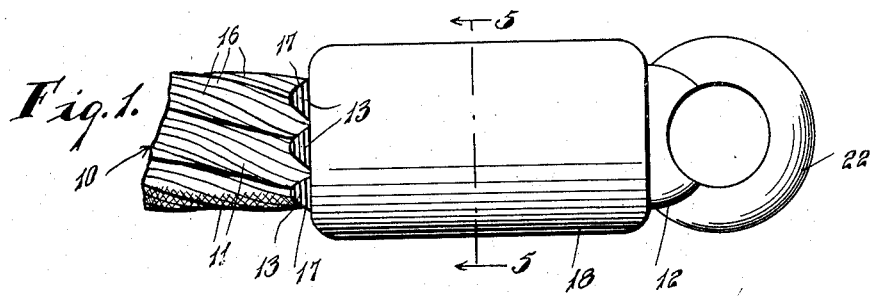
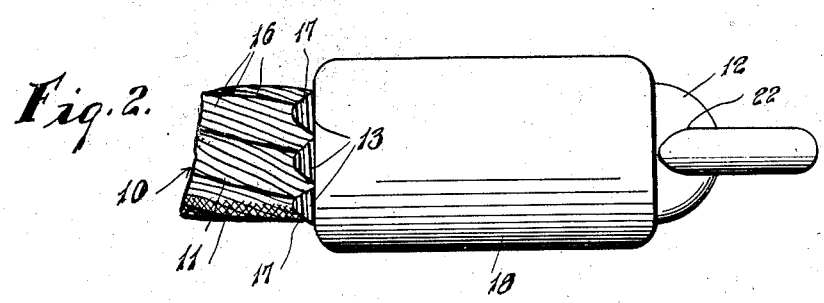
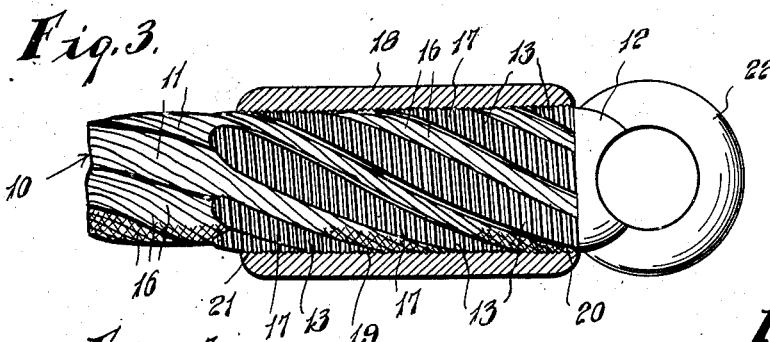
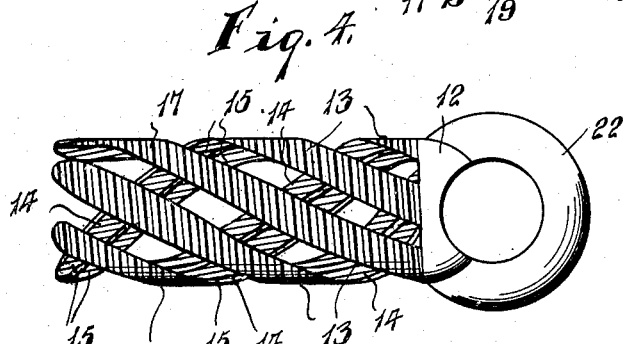
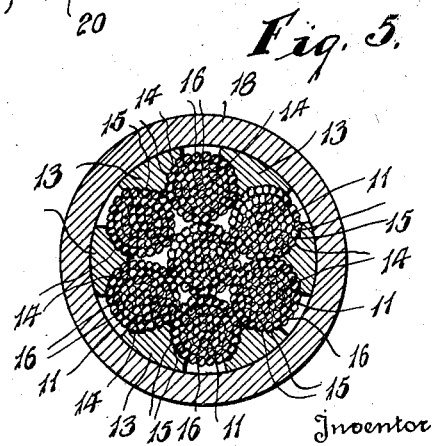
Inventor
Leslie Robinson
By L. F. Randolph Jr.
Attorney Patented Mar. 2, 1937

2,072,215

UNITED STATES PATENT OFFICE 2,072,215

WIRE CABLE END CLAMP

Leslie Robinson, Hedley, British Columbia, Canada

Application February 14, 1935, Serial No. 6,604

4 Claims. (Cl. 24—124)

The invention relates to a clamping device for the ends of wire cables and has for its object the provision of means for engaging the coils of a wire cable and securely holding them to prevent separation and unraveling.

A further object of the invention is the provision of a clamping means for wire cables comprising a suitable head to engage the extremity of a cable and having a plurality of fingers extending therefrom that are substantially triangular in cross section to engage in the interstices between the coils of the cable, said fingers having their outer surfaces provided with alined threads, and a clamping sleeve having a tapered bore threaded to engage the threads on the fingers and to hold them intimately engaged with the coils of the cable. The head may or may not be provided with a ring or loop for securing the end of the cable to a suitable hook or other fastening means, and also providing means for threading the cable on the sheaves of pulleys.

The invention will be described in detail hereinafter and will be found illustrated in the accompanying drawing, in which:

Figure 1 is a view in elevation of the end fragment of a wire cable showing the improved clamp mounted thereon, Figure 2 is a similar view at 90 degrees removed from the view of Figure 1;

Figure 3 is a view similar to Figure 1 showing the clamping sleeve in longitudinal section;

Figure 4 is a view of the clamp with the sleeve removed; and

Figure 5 is a transverse sectional view on a plane indicated by the line 5—5 of Figure 1.

In the drawing, similar reference characters are used to designate corresponding parts in all the views.

The end clamp is adapted to be secured to the end of a wire cable such as shown at 10, and made up of a plurality of sections 11 that are coiled on one another and usually constructed of a plurality of strands of wire that are in turn twisted or coiled on one another providing the separate coils 11.

The invention is adapted to be secured to the end of the wire cable 10 and consists of a head 12 having a plurality of fingers 13 that are arranged in spaced relation around the periphery of the head 12 and extend spirally therefrom as shown in Figures 3 and 4. Each of said fingers 13 are substantially triangular in cross section as best shown in Figure 5, having two sides 14 arranged at an angle to one another to engage between the coils 11, and said sides 14 are provided with a plurality of parallel groves 15 to receive and clamp the individual wires of the coils 11, said wires being designated 16. The outer faces of the fingers 13 are provided with alined screw-threads 17, and 18 indicates a sleeve mounted on the fingers 13, and interiorly threaded as shown at 19 to engage the threads 17. The bore of the sleeve 18 towards the head 12 is slightly larger in diameter than the opposite end of the sleeve, 20 designating the end of the sleeve having the larger bore, said bore being tapered to the end 21. This structure is provided so as to expedite mounting the sleeve on the fingers, the fingers being pressed into intimate contact with the coils when the sleeve is screwed onto the fingers by engagement of the threads 17 and 19.

The head 12 is preferably provided with an integral ring or loop 22 to enable securing the cable end to a hook or other engaging member, not shown, and said ring or loop is also useful in easing the cable onto the sheave of a pulley and for other purposes.

What is claimed is:—

1. In a wire cable end clamp, a head, a plurality of individual fingers each substantially triangular in cross-section and arranged circumferentially on said head, each individual finger being spiral to engage in a single spiral groove between the outer coils of a cable, the cable engaging surfaces of said fingers being angular in cross section to engage between the outer coils of the cable, and a sleeve engaging said fingers.

2. In a wire cable end clamp, a head, a plurality of individual fingers each substantially triangular in cross section and arranged circumferentially on said head, each individual finger being spiral to engage in a single spiral groove between the outer coils of a cable, and a sleeve in screw threaded engagement with said fingers.

3. In a wire cable end clamp, a head, a plurality of individual fingers each substantially triangular in cross section and arranged circumferentially of said head, each individual finger being spiral and having its inner surfaces curved to conform to the shape of the outer coils of a cable in a single groove thereof and said surfaces provided with grooves to receive the outer strands of said coils, and a sleeve screw threaded to said fingers.

4. A device as in claim 1, the outer surfaces of said fingers provided with alined threads, and a tubular sleeve engaging said fingers, the bore of said sleeve being tapered and threaded to engage said alined threads and hold the fingers in clamping engagement with the coils of the cable.

LESLIE ROBINSON.